C. C. BLAKE.
METHOD OF MAKING ADHESIVE JOINTS.
APPLICATION FILED JULY 1, 1915.

1,284,861.

Patented Nov. 12, 1918.
2 SHEETS—SHEET 1.

Inventor:
Charles C. Blake
by Charles W. McDermott
his attorney

C. C. BLAKE.
METHOD OF MAKING ADHESIVE JOINTS.
APPLICATION FILED JULY 1, 1915.

1,284,861.

Patented Nov. 12, 1918.

Inventor.
Charles C. Blake
by Charles K. McDermott
his attorney

UNITED STATES PATENT OFFICE.

CHARLES C. BLAKE, OF BROOKLINE, MASSACHUSETTS, ASSIGNOR TO C. C. BLAKE, INCORPORATED, OF BOSTON, MASSACHUSETTS, A CORPORATION OF NEW YORK.

METHOD OF MAKING ADHESIVE JOINTS.

1,284,861.  Specification of Letters Patent.  Patented Nov. 12, 1918.

Application filed July 1, 1915. Serial No. 37,603.

*To all whom it may concern:*

Be it known that I, CHARLES C. BLAKE, a citizen of the United States, residing at Brookline, in the county of Norfolk and State of Massachusetts, have invented a new and useful Improvement in Methods for Making Adhesive Joints, of which the following is a specification.

The present invention relates to adhesive joints by means of which separate pieces of material are connected.

In one method of making adhesive joints the parts to be joined are coated with a liquid adhesive and then the coated parts are pressed together until the joint is made. This method is wasteful of the adhesive and also causes considerable annoyance owing to the difficulty of keeping the exposed surfaces of the joined parts clean. A better method of making adhesive joints is to coat one or both of the parts to be joined with a normally non-tacky adhesive, press the parts together, and render the adhesive tacky by the application of heat to one or both of the exposed surfaces of the parts. While the second method is a better method than the first method for many uses the second method cannot be employed as the application of heat to the exposed surfaces of the parts to be joined damages the material.

In the method of lasting shoes devised by me the upper is first updrawn, then the updrawn upper is clamped against the edge face of the sole on the last, and finally a coating of liquid cement is interposed between the sole and the upper for the purpose of securing the upper to the edge face of the sole. In order to effect an economy in the use of the cement and also to obviate all danger of soiling the upper of the shoe it has been proposed to provide the edge face of the sole with a coating of the type hereinbefore referred to which is normally non-adhesive under ordinary conditions of temperature but which is capable of being rendered tacky under the influence of heat. After the upper was updrawn it was then proposed to secure the updrawn upper to the edge face of the insole by applying heat and pressure to the exposed face of the upper. The heat penetrated the upper and rendered the adhesive coating on the insole tacky so that a good joint was made by this method. Unfortunately the upper was damaged by the application of heat to its exposed face so that the practice of this method had to be abandoned.

The object of the present invention is to provide a novel method of making adhesive joints, having all the advantages of the second method hereinbefore referred to, which may be practised without injury to the materials of the parts to be joined.

To the accomplishment of this object and such others as may hereinafter appear the features of the present invention relate to certain methods, devices, combinations and arrangements of parts, hereinafter described and then set forth broadly and in detail in the appended claims, which possess advantages readily apparent to those skilled in the art.

The various features of the present invention will be best understood from an inspection of the accompanying drawings illustrating the preferred embodiments of the invention, in which, Figure 1 is a plan of an insole for a welt shoe which is to be connected to an upper;

Figure 1:
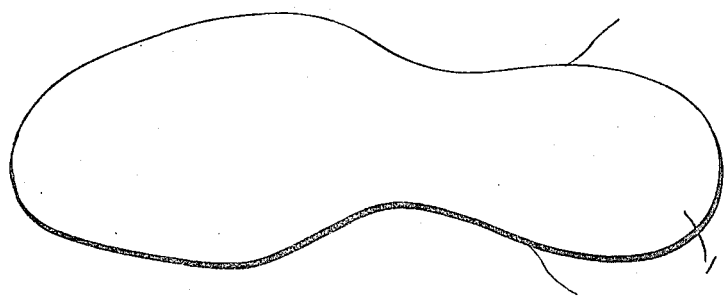
Figure 2:
Fig. 2 is a lateral sectional elevation of the insole.
Figure 3:
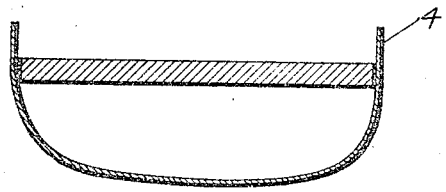
Fig. 3 is a lateral sectional elevation of a lasted welt shoe.
Figure 4:
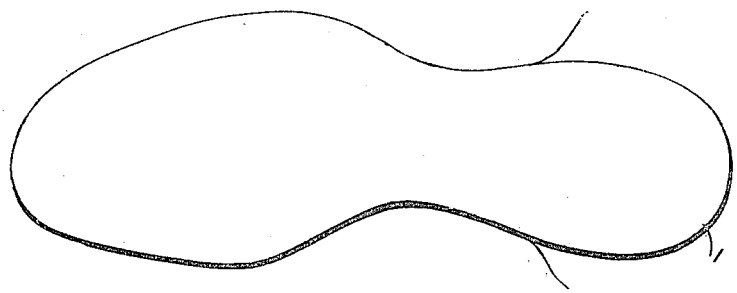
Fig. 4 is a plan of an insole for a welt shoe as prepared by another form of the invention.
Figure 5:
Fig. 5 is a lateral sectional elevation of a grooved insole.
Figure 6:
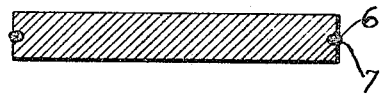
Fig. 6 is a lateral sectional elevation of an insole having the groove therein provided with an adhesive covered wire.
Figure 7:
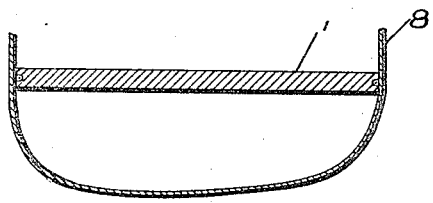
Fig. 7 is a lateral sectional elevation of a lasted shoe the upper and insole of which have been connected in accordance with the second form of the invention.

Referring now to the drawings an insole 1 is provided along its edge face with a coating 2 (Figs. 2 and 3) in which is embedded a conductor, hereinafter termed a thermal conductor, for transmitting force, such as heat or electricity. While the thermal conductor may be a tube for transmitting steam, hot air or other heating medium it is preferred to employ a wire of heat-producing resistance for conducting electricity. The coating may be jeweler's cement, sealing wax or some other of the well known normally non-tacky adhesives, all of which are non-conductors. The insole is secured to a last in the usual way and an upper 4 is then updrawn in the manner illustrated in Fig. 3. The updrawn upper is then firmly pressed against the edge face of the insole and a current of electricity passed through the wire 3. As the wire has a high resistance it soon becomes red hot whereupon the coating 2 is rendered tacky thus making a tight joint between the insole and upper. With this method the heat is applied directly to the contacting faces of the parts to be joined thus obviating all danger of damage resulting to the material of the parts.

In the other form of the invention the insole 1 is provided with a groove 5 along its edge face which is filled with a coating 6 of normally non-tacky adhesive. Embedded in this coating is a fine wire 7 for carrying the electric current. The insole and an upper 8 are then assembled on a last, the upper is updrawn, and the insole and upper united by the adhesive which is heated through a current of electricity passed through the wire 7. The wire while hot may be withdrawn longitudinally through the groove without affecting the joint between the upper and insole. As the wire employed is very fine for many uses it may be allowed to remain in the joint with safety.

While the illustrated embodiment of the present invention is directed to an improved method of connecting the upper and sole of a shoe it is not to be understood as limiting the scope of the claims, where the context otherwise permits, to the exclusive practice of this method in the manufacture of shoes as it will be apparent to those skilled in other arts that the methods herein disclosed may be advantageously employed in connecting materials of many kinds.

The operations which are performed as above described and illustrated are those which are preferred in practising the present invention. It is to be understood, however, that except as defined in the claims the invention is not limited to the precise methods illustrated and described and that the steps of the method may be varied or modified without departing from the spirit of the invention.

What is claimed as new. is:—

1. That improvement in the art of securing two members together which consists in providing one or both of the members with a non-conductive coating which is normally non-adhesive but which is rendered tacky under the influence of heat, pressing the members together, and rendering the coating tacky by application of heat directly to the coating between the contacting faces of the members, substantially as described.

2. That improvement in the art of lasting shoes which consists in providing a sole with a coating which is normally non-adhesive but which is rendered tacky under the influence of heat, pressing the upper against the sole, and rendering the coating tacky by application of heat directly to the coating between the contacting faces of the members, substantially as described.

3. That improvement in the art of securing members together which consists in interposing between the members an adhesive covered thermal conductor, pressing the members together, and passing a heating medium through the conductor to melt the adhesive by conduction from the conductor, substantially as described.

4. That improvement in the art of securing members together which consists in interposing between the members an adhesive covered electric conductor, pressing the members together, and passing an electric current through the conductor to melt the adhesive, substantially as described.

5. That improvement in the art of securing two members together which consists in attaching to one of the members an adhesive covered electric conductor, pressing the members together adjacent the conductor, and passing an electric current through the conductor to melt the adhesive, substantially as described.

6. That improvement in the art of lasting shoes which consists in applying an adhesive covered wire to the sole, pressing the upper against the sole adjacent the wire, and passing an electric current through the wire to melt the adhesive, substantially as described.

7. That improvement in the art of lasting shoes which consists in applying an adhesive to the edge face of a sole, embedding an electric conductor in the adhesive, assembling the sole and upper, updrawing the upper, holding the updrawn upper pressed against the edge face of the sole, and passing an electric current through the conductor to melt the adhesive, substantially as described.

8. That improvement in the art of securing members together which consists in interposing between the members an adhesive covered thermal conductor, pressing the members together, passing a heating medium through the conductor to melt the adhesive, and finally withdrawing the conductor, substantially as described.

9. That improvement in the art of securing members together which consists in grooving one of the members and laying an adhesive covered thermal conductor in the groove, pressing the other member against the first member, passing a heating medium through the conductor, and finally withdrawing the conductor longitudinally from the groove, substantially as described.

10. That improvement in the art of securing two members together which consists in providing one or both of the members with a non-conductive coating which is normally non-adhesive but which is rendered tacky under the influence of heat, pressing the members together, and heating the coating and the contacting faces of the members by conduction from a conductor interposed between the members, substantially as described.

11. That improvement in the art of lasting shoes which consists in providing the edge face of a sole with a coating which is normally non-adhesive, but which is rendered tacky under the influence of heat, holding an upper against the edge face of the sole, and heating the coating and the contacting parts of the upper and sole by conduction from a conductor interposed between the upper and sole.

CHARLES C. BLAKE.

Copies of this patent may be obtained for five cents each, by addressing the "Commissioner of Patents, Washington, D. C."